United States Patent
Sung et al.

(10) Patent No.: US 8,528,353 B2
(45) Date of Patent: Sep. 10, 2013

(54) REFRIGERATOR AND THE CONTROLLING METHOD

(75) Inventors: Ji Won Sung, Seoul (KR); Chan Ho Chun, Seoul (KR); Chang Oh Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 808 days.

(21) Appl. No.: 12/593,684

(22) PCT Filed: Jan. 26, 2008

(86) PCT No.: PCT/KR2008/000488
§ 371 (c)(1),
(2), (4) Date: Jul. 27, 2010

(87) PCT Pub. No.: WO2008/120860
PCT Pub. Date: Oct. 9, 2008

(65) Prior Publication Data
US 2010/0179693 A1    Jul. 15, 2010

(30) Foreign Application Priority Data
Mar. 30, 2007 (KR) .................. 10-2007-0031660

(51) Int. Cl.
*F25B 49/02* (2006.01)
(52) U.S. Cl.
USPC .............. 62/228.1; 62/228.4; 62/229
(58) Field of Classification Search
USPC ............ 700/278; 62/228.1, 228.4, 229
See application file for complete search history.

(56) References Cited

U.S. PATENT DOCUMENTS

| 5,947,693 | A  | * | 9/1999 | Yang ........................... 417/45 |
| 7,100,387 | B2 | * | 9/2006 | Boer et al. ............... 62/228.5 |
| 2006/0130504 | A1 | * | 6/2006 | Agrawal et al. ......... 62/228.4 |

FOREIGN PATENT DOCUMENTS

| KR | 10-2000-0002005 | 1/2000 |
| KR | 10-0332292 | 4/2002 |
| KR | 10-0597732 | 7/2006 |
| KR | 10-0631565 | 10/2006 |

OTHER PUBLICATIONS

International Search Report dated May 23, 2008.

* cited by examiner

*Primary Examiner* — Marc Norman
*Assistant Examiner* — Jonathan Bradford
(74) *Attorney, Agent, or Firm* — KED & Associates LLP (57) ABSTRACT

There are provided a refrigerator and a method of controlling the same. The method of controlling a refrigerator includes varying stroke of an inverter linear compressor to operate the inverter linear compressor by a maximum output when a temperature of an inside of a freezer compartment or a refrigerator compartment is higher than a maximum output temperature and varying the stroke of the inverter linear compressor at one period interval to operate the inverter linear compressor when the temperature of the inside of the freezer compartment or the refrigerator compartment is no more than the maximum output temperature.

18 Claims, 8 Drawing Sheets

REFRIGERATOR AND THE CONTROLLING METHOD

TECHNICAL FIELD

The present invention relates to a refrigerator and a method of controlling the same, and more particularly, to a refrigerator operated by varying the stroke of an inverter linear compressor and a method of controlling the same.

BACKGROUND ART

In general, a compressor is a mechanical device that receives driving force from a driving force generator such as an electric motor and a turbine to compress the air, refrigerant, or various operation gases and to increase pressure and is widely used for electric home appliances such as a refrigerator and an air conditioner or all over the industry.

The compressor is divided into a reciprocating compressor that forms a compression space into which an operation gas is suctioned and from which an operation gas is discharged between a piston and a cylinder so that the piston linearly reciprocates to compress the refrigerant, a rotary compressor that forms the compression space into which the operation gas is suctioned and from which the operation gas is discharged between an eccentrically rotating roller and a cylinder so that the roller eccentrically rotates along the internal wall of the cylinder to compress the refrigerant, and a scroll compressor that forms a compression space into which the operation gas is suctioned and from which the operation gas is discharged between an orbiting scroll and a fixed scroll so that the orbiting scroll rotates in accordance with a fixed scroll to compress the refrigerant.

Recently, in the reciprocating compressor, an inverter linear compressor having a simple structure in which a piston is directly connected to a reciprocating motor that linearly reciprocates to improve compression efficiency without mechanical loss caused by motion conversion and having a free piston structure in which a connecting rod that restricts the motion of the piston does not exist unlike in the reciprocating compressor are being developed.

DISCLOSURE OF INVENTION

In order to solve the above-described problems, it is an object of the present invention to provide a refrigerator comprising an inverter circuit for supplying an operating control signal so that an inverter linear compressor is operated, a sensor unit comprising at least one sensor for measuring temperatures of insides of a freezer compartment and a refrigerator compartment, and a controller for comparing the temperature of the inside of the freezer compartment or the refrigerator compartment with a maximum output temperature to supply a control signal to the inverter circuit so that the stroke of the inverter linear compressor varies at one period interval and that the output of the inverter linear compressor varies when the temperature of the inside of the freezer compartment or the refrigerator compartment is no more than the maximum output temperature.

A method of controlling a refrigerator comprises varying stroke of an inverter linear compressor to operate the inverter linear compressor by a maximum output when a temperature of an inside of a freezer compartment or a refrigerator compartment is higher than a maximum output temperature and varying the stroke of the inverter linear compressor at one period interval to operate the inverter linear compressor when the temperature of the inside of the freezer compartment or the refrigerator compartment is no more than the maximum output temperature.

BEST MODE FOR CARRYING OUT THE INVENTION

Hereinafter, a refrigerator according to the present invention and a method of controlling the same will be described in detail with reference to accompanying drawings.

Figure 1:
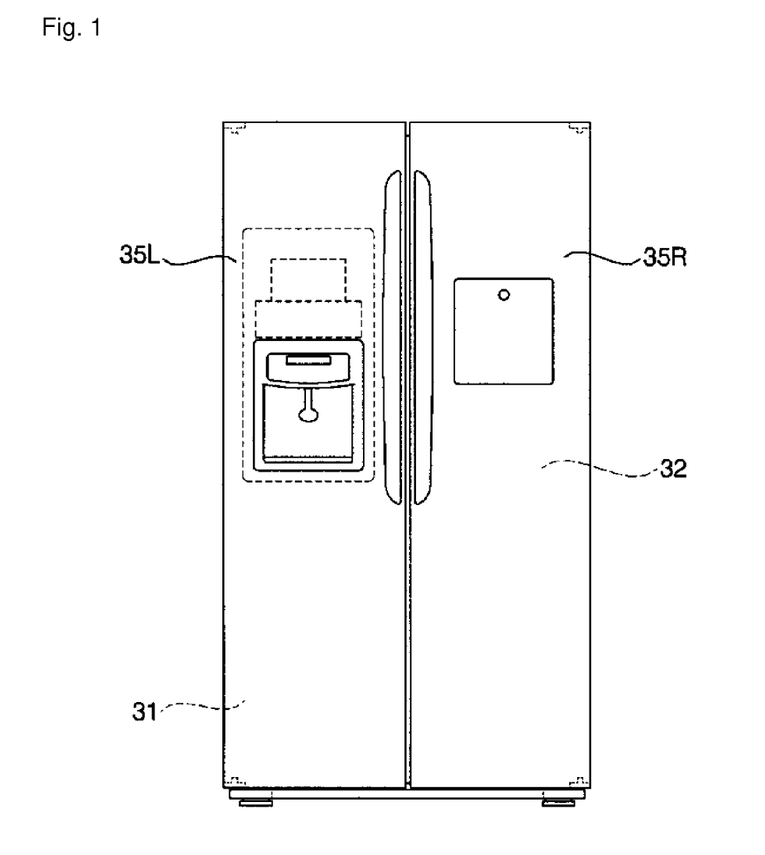
FIG. 1 is a front view illustrating a refrigerator according to a first embodiment of the present invention.
Figure 2:
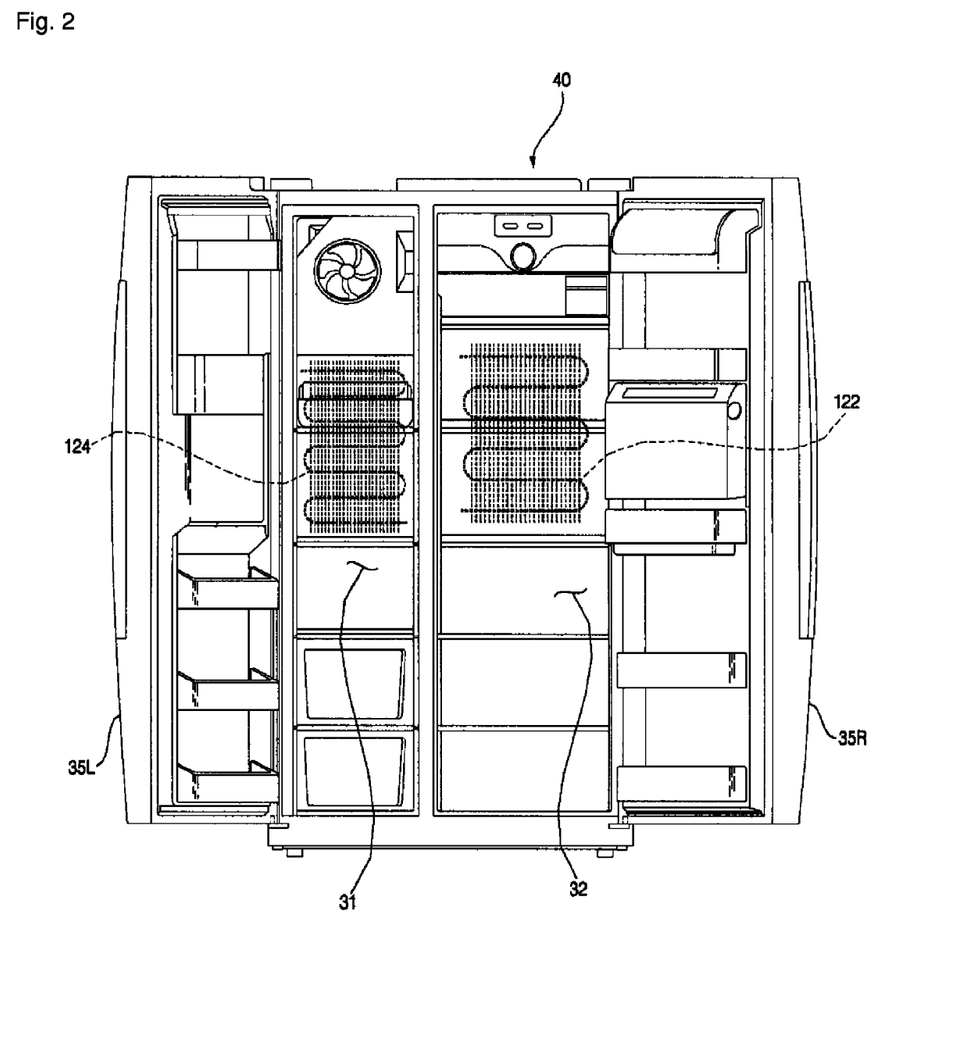
FIG. 2 is a front view illustrating the inside of the refrigerator of FIG. 1.

FIG. 1 is a front view illustrating a refrigerator according to a first embodiment of the present invention. FIG. 2 is a front view illustrating the inside of the refrigerator of FIG. 1.

Referring to FIGS. 1 and 2, the refrigerator includes a main body 41 including a freezer compartment 31 and a refrigerator compartment 32 and doors 35L and 35R connected to the main body 41 by a hinge to open and close the freezer compartment 31 and the refrigerator compartment 32.

Here, the freezer compartment 31 and the refrigerator compartment 32 are separated from each other so that chilled air does not flow due to a partition 33 provided in the main body 41 and a freezer compartment evaporator (not shown) and a refrigerator compartment evaporator (not shown) for cooling the freezer compartment 31 and the refrigerator compartment 32 are provided in the freezer compartment 31 and the refrigerator compartment 32.

Figure 3:
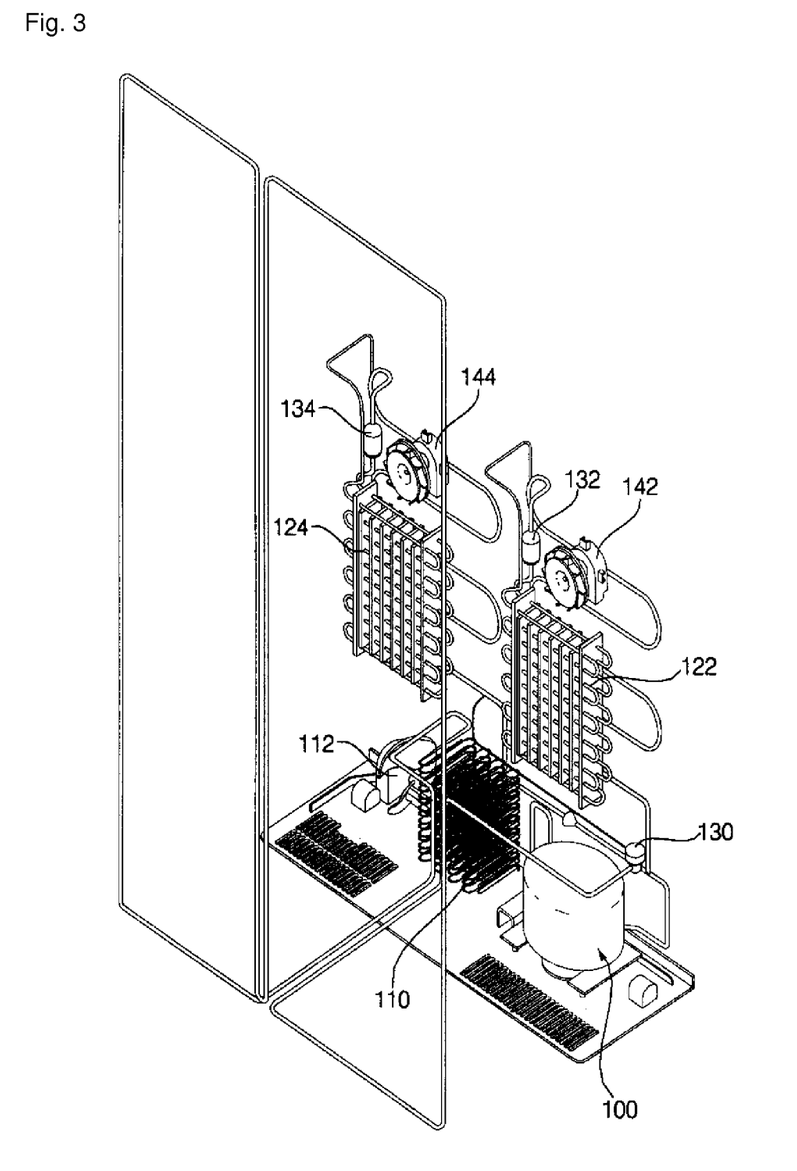
FIG. 3 is a perspective view illustrating the devices of the refrigerator of FIG. 1.
Figure 4:
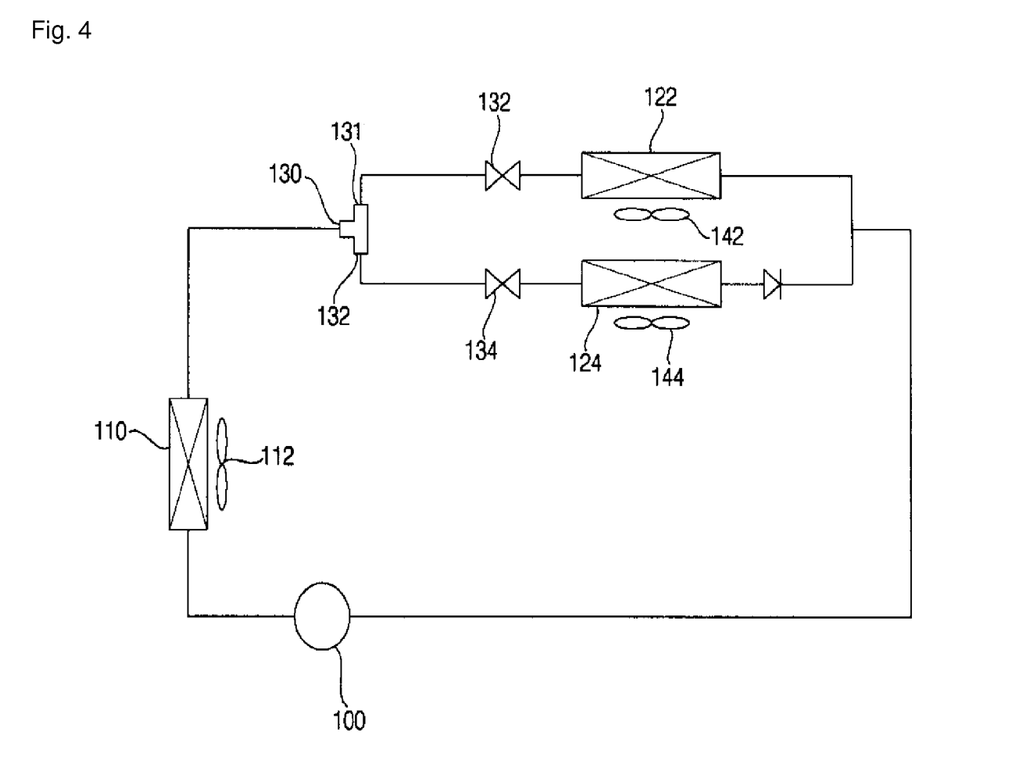
FIG. 4 is a block diagram schematically illustrating the structure of the devices of FIG. 3.

FIG. 3 is a perspective view illustrating the devices of the refrigerator of FIG. 1. FIG. 4 is a block diagram schematically illustrating the structure of the devices of FIG. 3.

Referring to FIGS. 3 and 4, the refrigerator includes a compressor 100, a condenser 110 for condensing refrigerant compressed by the compressor 100, a freezer compartment evaporator 124 provided in the freezer compartment 31 and a refrigerator compartment evaporator 122 provided in the refrigerator compartment 32 that receive the refrigerant condensed by the condenser 110 to evaporate the received refrigerant, a 3-way valve 130 for supplying the refrigerant condensed by the condenser 110 to the refrigerator compartment evaporator 122 or the freezer compartment evaporator 124, a refrigerator compartment expansion valve 132 for expanding the refrigerant supplied to the refrigerator compartment evaporator 122, and a freezer compartment expansion valve 134 for expanding the refrigerant supplied to the freezer compartment evaporator 124.

Here, a refrigerator compartment fan 142 for improving the heat exchange efficiency of the refrigerator compartment evaporator 122 and for circulating the air in the refrigerator compartment 32 is provided in the refrigerator compartment 32. In addition, a freezer compartment fan 144 for improving the heat exchange efficiency of the freezer compartment evaporator 124 and for circulating the air in the freezer compartment 31 is provided in the freezer compartment 31.

A check valve (not shown) for preventing the refrigerant of the freezer compartment evaporator 124 from being introduced is provided in the discharge side of the refrigerator compartment evaporator 122.

The 3-way valve 130 can selectively open and close the passage of the refrigerant supplied from the condenser 110 and can open or close one of the refrigerator compartment expansion valve 132 or the freezer compartment expansion valve 134.

Here, the passage of the refrigerator compartment of the 3-way valve 130 is referred to as a "R valve", the passage of the freezer compartment is referred to as an "F valve", the opening and closing of the passage of the refrigerator compartment is referred to as on/off of the R valve, and the opening and closing of the passage of the freezer compartment is referred to as on/off of the F valve.

On the other hand, in the present embodiment, the 3-way valve 130 is provided. However, the opening and closing valves can be provided in the pipes connected to the refrigerator compartment/freezer compartment evaporators 122 and 124 instead of the 3-way valve 130, which is not limited.

Figure 5:
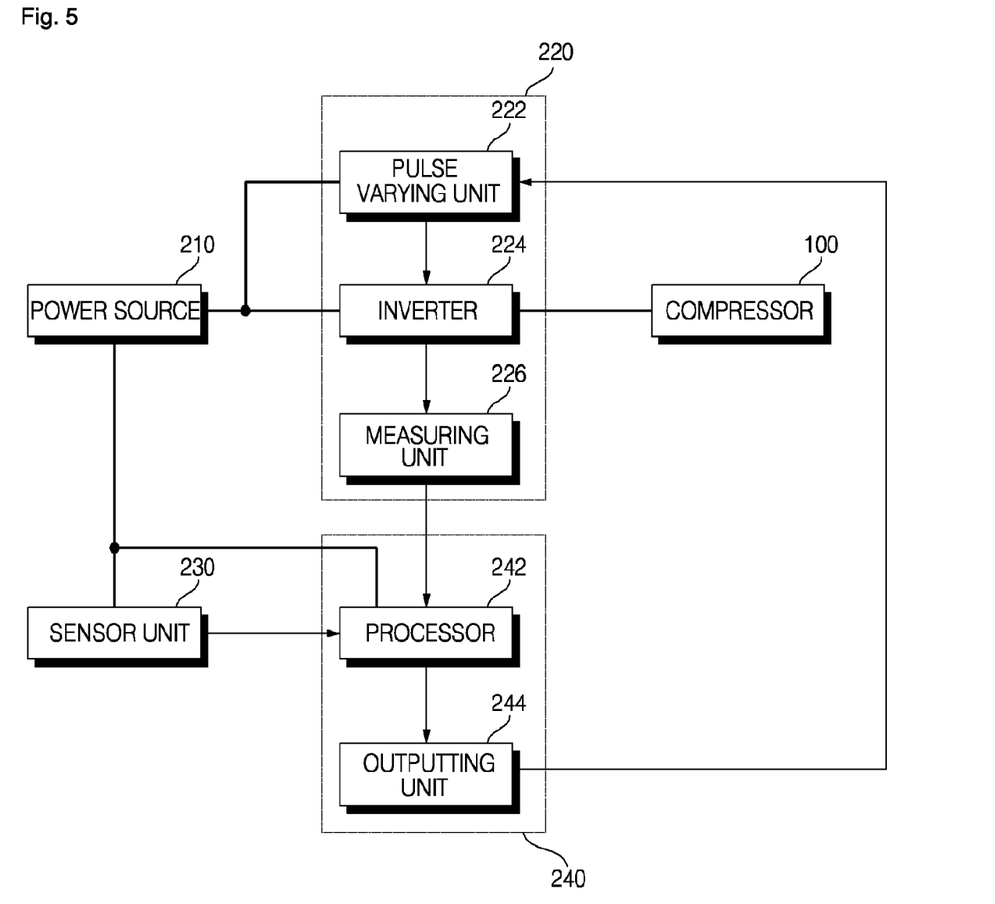
FIG. 5 is a block diagram of the controlling of the refrigerator according to the first embodiment of the present invention.

FIG. 5 is a block diagram of the controlling of the refrigerator according to the first embodiment of the present invention.

Referring to FIG. 5, the refrigerator includes a compressor 100, a power source 210 for rectifying an alternate current (AC) power source input from the outside through a bridge diode (not shown) or a rectifying device (not shown) and for smoothing a rectified direct current (DC) voltage, an inverter circuit 220 for supplying a operating control signal to the compressor 100 through the DC voltage supplied from the power source 210, a sensor unit 230 including at least one sensor for measuring the temperatures of the insides and the outsides of the freezer compartment 31 and the refrigerator compartment 32 by the DC voltage of the power source 210, and a controller 240 for controlling the inverter circuit 220 and the sensor unit 230.

Here, the compressor 100 is an inverter linear compressor and the inverter linear compressor varies stroke to change refrigerating force so that the stroke of the compressor 100 varies and that an output is controlled, which is technically different from a method of changing the refrigerating force in accordance with the number of rotations of the inverter compressor.

The inverter circuit 220 includes a pulse varying unit 222 for outputting a variable signal whose period and phase vary with respect to the operating control signal supplied to the compressor 100 in accordance with the control signal of the controller 240, an inverter 224 for supplying the operating control signal to the compressor 100 by the variable signal applied from the pulse varying unit 222, and a measuring unit 226 for measuring the current and the voltage of the operating control signal to transmit the measured current and voltage to the controller 240.

In addition, the controller 240 includes a processor 242 for receiving the temperatures of the insides of the freezer compartment 31 and the refrigerator compartment 32 that are measured by the sensor unit 230 and for comparing the maximum output temperature, the first and second target temperatures, and the first, second, third, and fourth set temperatures that are set for the freezer compartment 31 and the refrigerator compartment 32 to calculate a variable value so that the stroke of the compressor 100 varies at one period interval and an outputting unit 244 for transmitting the control signal including the variable value calculated by the processor 242 to the pulse varying unit 222.

Here, the processor 242 varies the stroke of the compressor 100 to calculate the variable value so that an output is between 85% and 75% for the maximum output when the temperature of the inside of the freezer compartment 31 is no more than the maximum output temperature and between the first target temperature and the first set temperature.

In addition, the processor 242 varies the stroke of the compressor 100 to calculate the variable value so that an output is between 75% and 55% for the maximum output when the temperature of the inside of the refrigerator compartment 31 is no more than the maximum output temperature and between the first target temperature and the second set temperature.

Then, the processor 242 varies the stroke of the compressor 100 to calculate the variable value so that an output is between 85% and 75% for the maximum output when the temperature of the inside of the refrigerator compartment 32 is no more than the maximum output temperature and between the second target temperature and the third set temperature and varies the stroke of the compressor 100 to calculate the variable value so that an output is between 65% and 45% for the maximum output when the temperature of the inside of the refrigerator compartment 32 is between the second target temperature and the fourth set temperature.

Figure 6:
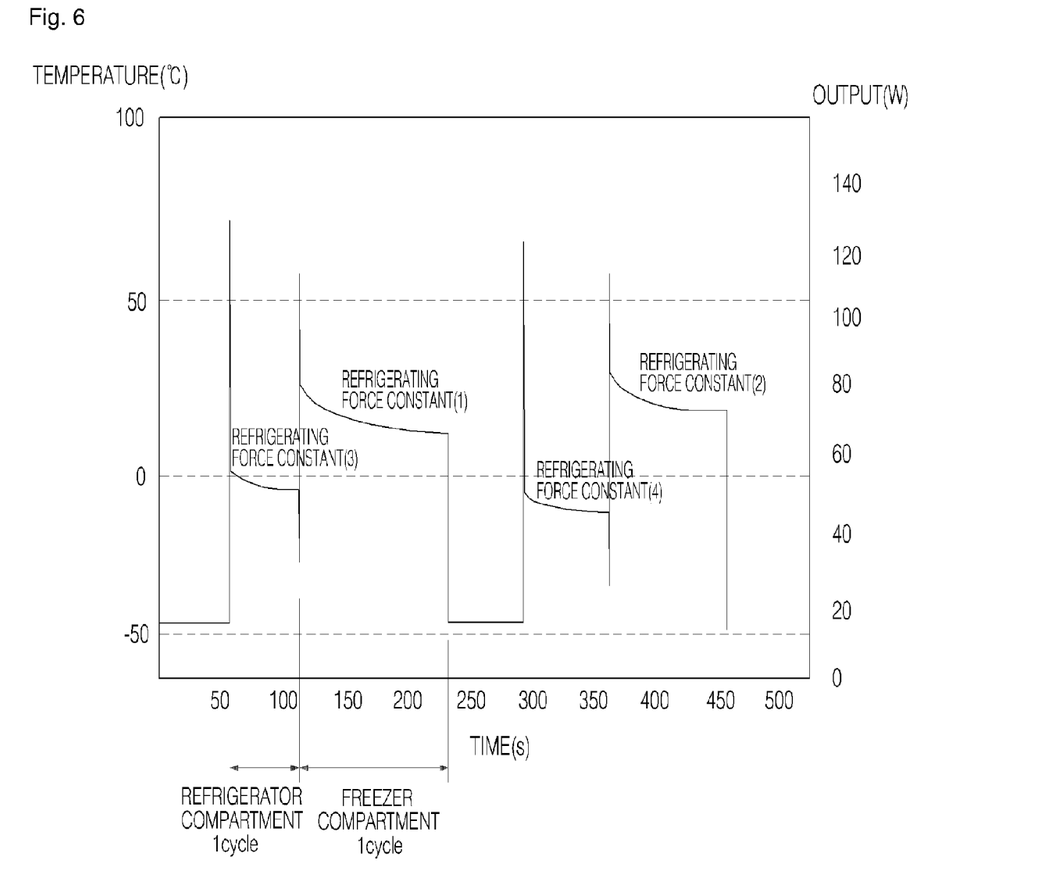
FIG. 6 is a graph illustrating that the refrigerating force of the refrigerator of FIG. 5.

FIG. 6 is a graph illustrating that the refrigerating force of the refrigerator of FIG. 5.

FIG. 6 is a table divided into a temperature ° C., an output W, and a time s to illustrate the output consumption voltage of the compressor.

Here, based on one cycle for the freezer compartment 31 and the refrigerator compartment 32, as illustrated by a refrigerating force constant 1 and a refrigerating force constant 2, in the freezer compartment 31, the time and output W of one cycle of the compressor 100 vary in accordance with a temperature ° C.

In addition, in the refrigerator compartment 32, the time and the output W of one cycle of the compressor 100 of a refrigerating force constant 3 and a refrigerating force constant 4 vary.

Figure 7:
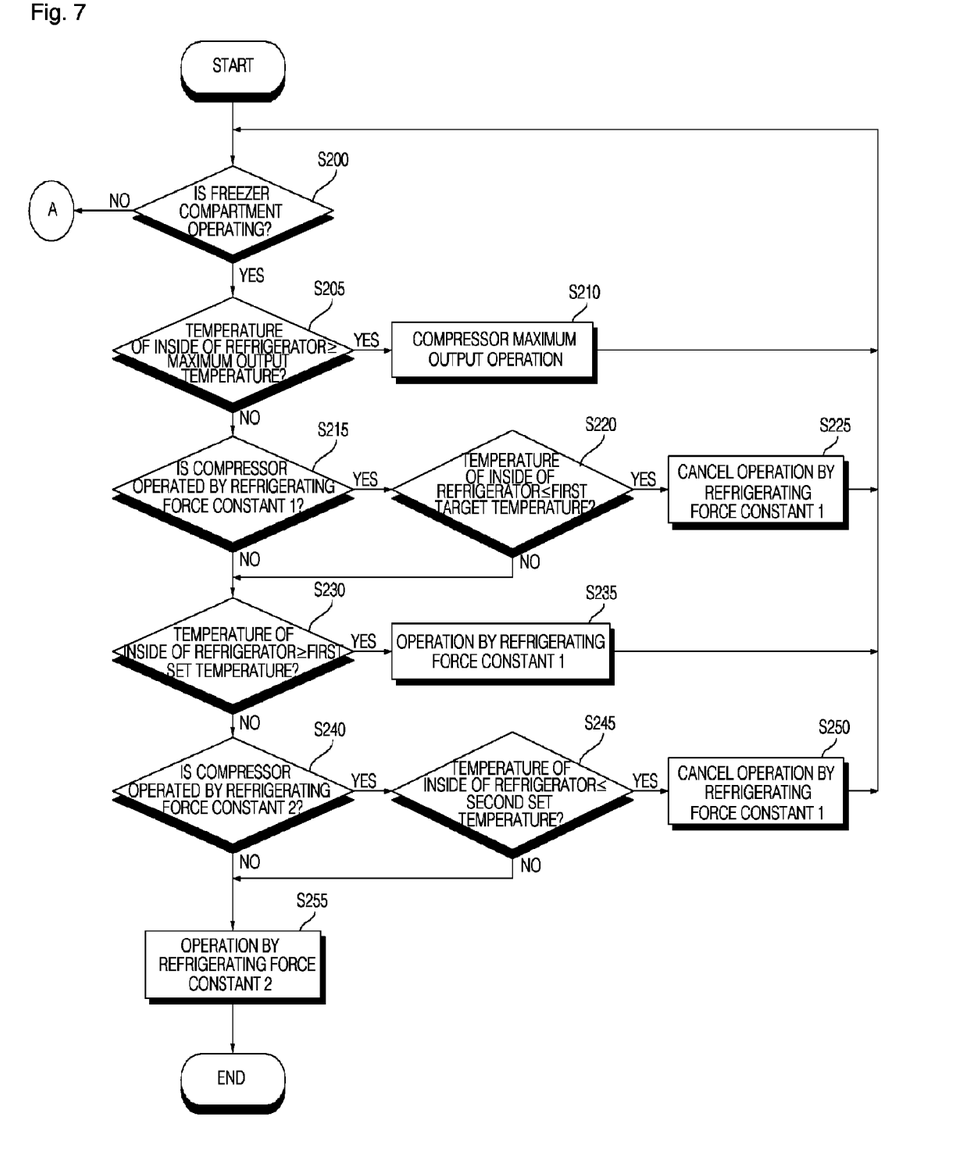
FIG. 7 is a flowchart illustrating a method of controlling a freezer compartment according to the first embodiment of the present invention.

FIG. 7 is a flowchart illustrating a method of controlling a freezer compartment according to the first embodiment of the present invention.

Referring to FIG. 7, it is determined whether there is a freezer compartment (S200).

That is, the controller 240 determines whether the operating control signal is supplied to the compressor 100 in order to operate the freezer compartment 31.

Here, when the freezer compartment 31 does not operate, it is checked whether the refrigerator compartment 32 operates. A method of controlling the refrigerator compartment 32 will be described in detail with reference to FIG. 8.

When the freezer compartment operates, the temperature of the inside of the freezer compartment is compared with the maximum output temperature to determine whether the temperature of the inside of the freezer compartment is no less than the maximum output temperature (S205). When it is determined that the temperature of the inside of the freezer compartment is no less than the maximum output temperature, the compressor is operated by the maximum output (S210).

That is, the controller 240 outputs a control signal so that, when the freezer compartment 31 operates, the temperature of the inside of the freezer compartment 31 measured by at least one sensor included in the sensor 230 is received and that, when the temperature of the inside of the freezer compartment 31 is no less than the maximum output temperature, the compressor 100 is operated by the maximum output.

At this time, the consumption power of the compressor 100 is maximized in accordance with the maximum output operation.

In addition, the controller 240 transmits the control signal to the pulse varying unit 222 of the inverter circuit 220 and the pulse varying unit 222 generates a variable value to supply the operation control signal based on the variable value from the outputting unit 224 to the compressor 100.

Therefore, the compressor 100 is operated by the maximum output in accordance with the operation control signal.

When it is determined in S205 that the temperature of the inside of the freezer compartment is no more than the maximum output temperature, it is determined that the compressor is operated by the refrigerating force constant 1 (S215). When it is determined that the compressor is operated by the refrigerating force constant 1, the temperature of the inside of the freezer compartment is compared with the first target temperature (S220). When it is determined that the temperature of the inside of the freezer compartment is no more than the first target temperature, the refrigerating force constant 1 of the compressor is cancelled (S225).

That is, when the temperature of the inside of the freezer compartment 31 is no more than the maximum output temperature, the controller 240 determines that the compressor 100 is operated by the refrigerating force constant 1.

Here, the refrigerating force constant 1 means that the compressor 100 is operated by the output between 85% and 75% for the maximum output operation of the compressor 100. That is, since the refrigerating force constant 1 varies the stroke of the compressor 100 so that an output is lower than the maximum output operation, power consumption is reduced.

Therefore, when the compressor 100 is operated by the refrigerating force constant 1, the controller 240 compares the temperature of the inside of the freezer compartment 31 with the first target temperature so that the operation by the refrigerating force constant is cancelled when the temperature of the inside of the freezer compartment 31 is no more than the first target temperature.

When it is determined in S215 that the compressor is not operated by the refrigerating force constant 1, it is determined whether the temperature of the inside of the freezer compartment is no less than the first set temperature based on the first target temperature (S230). When the temperature of the inside of the freezer compartment is no less than the first set temperature, the compressor is operated by the refrigerating force constant 1 (S235).

That is, when the compressor 100 is not operated by the refrigerating force constant 1, the controller 240 compares the temperature of the inside of the freezer compartment 31 with the first set temperature.

At this time, when the temperature of the inside of the freezer compartment 31 is no less than the first set temperature, the controller 240 controls the inverter circuit 220 so that the compressor 100 is operated by the refrigerating force constant 1.

When it is determined in S230 that the temperature of the inside of the refrigerator is no more than the first set temperature, it is determined that the compressor is operated by the refrigerating force constant 2 (S240). When it is determined that the compressor is operated by the refrigerating force constant 2, it is determined whether the temperature of the inside of the freezer compartment is no more than the second set temperature (S245). When it is determined that the temperature of the inside of the freezer compartment is no more than the second set temperature, the operation by the refrigerating force constant 2 is cancelled (S250).

That is, the controller 240 determines whether the compressor 100 is operated by the refrigerating force constant 2.

The controller 240 determines whether the compressor 100 is operated by the refrigerating force constant 2 through the current and the voltage supplied from the inverter circuit 220 to the compressor 100.

The controller 240 performs control so that, when the compressor 100 is operated by the refrigerating force constant 2, the temperature of the inside of the freezer compartment 31 is no more than the second set temperature and that, when it is determined that the temperature of the inside of the freezer compartment 31 is no more than the second set temperature, the operation of the compressor 100 by the refrigerating force constant 2 is cancelled.

Here, in the refrigerating force constant 2, the compressor 100 is operated by an output between 74% and 55% for the maximum output operation of the compressor 100.

When it is determined in S240 that the compressor is not operated by the refrigerating force constant 2, the compressor is operated by the refrigerating force constant 2 (S255).

That is, when the compressor 100 is not operated by the refrigerating force constant 2, the controller 240 performs control so that the compressor 100 is operated by the refrigerating force constant 2 and that the temperature of the inside of the freezer compartment 31 is reduced.

Figure 8:
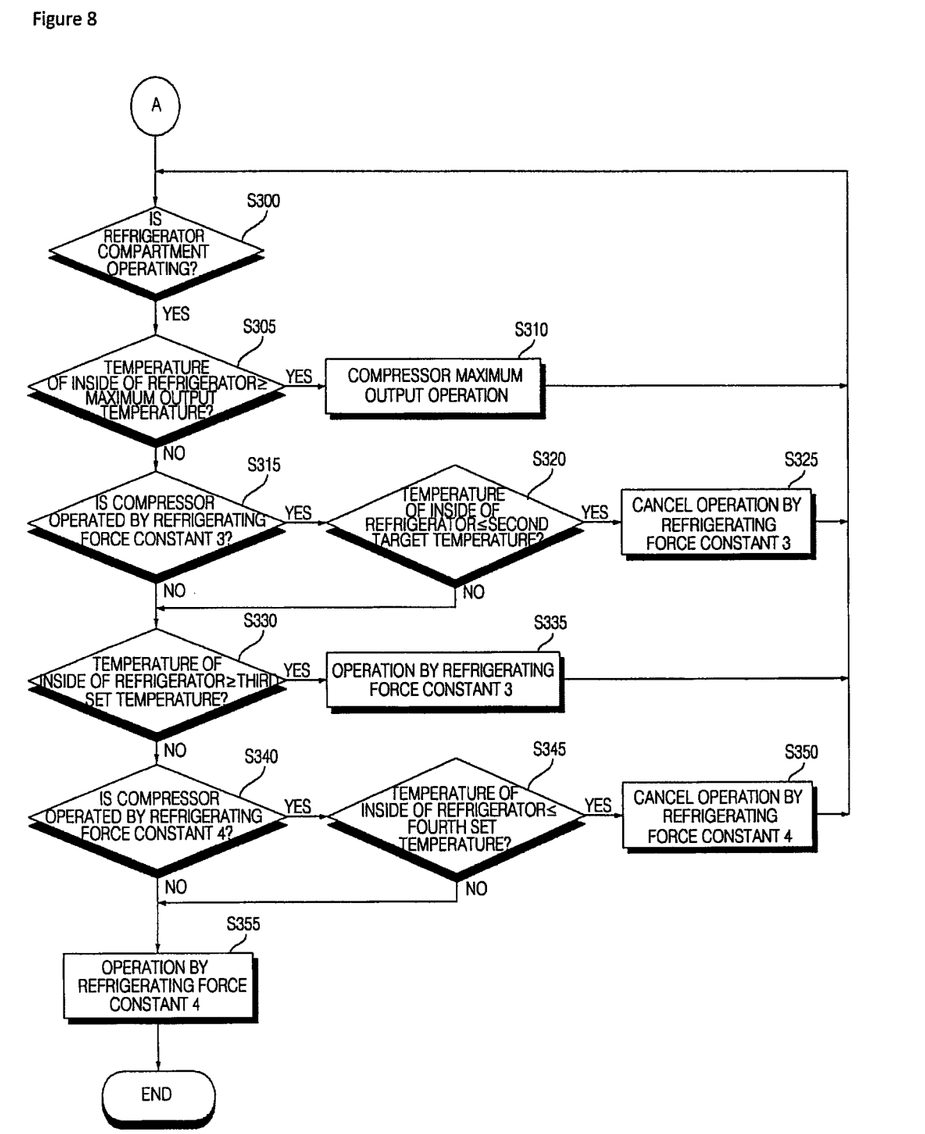
FIG. 8 is a flowchart illustrating a method of controlling a refrigerator compartment according to the first embodiment of the present invention.

FIG. 8 is a flowchart illustrating a method of controlling a refrigerator compartment according to the first embodiment of the present invention.

Referring to FIG. 8, it is determined whether the refrigerator compartment operates (S300).

That is, the controller 240 determines whether the operation control signal is supplied to the compressor 100 in order to operate the refrigerator compartment 32.

Here, when it is determined that the freezer compartment 31 is not operated, it is determined whether the refrigerator compartment 32 is operated.

When the refrigerator compartment is operated, the temperature of the inside of the refrigerator compartment is compared with the maximum output temperature to determine whether the temperature of the inside of the refrigerator compartment is no less than the maximum output temperature (S305). When it is determined that the temperature of the inside of the refrigerator compartment is no less than the maximum output temperature, the compressor is operated by the maximum output (S310).

That is, when the refrigerator compartment 32 is operated, the controller 240 receives the temperature of the inside of the refrigerator compartment 32 measured by at least one sensor included in the sensor 230 and outputs a control signal so that the compressor 100 is operated by the maximum output when the temperature of the inside of the refrigerator compartment 32 is no less than the maximum output temperature.

At this time, the power consumption of the compressor 100 is maximized in accordance with the maximum output operation.

In addition, the controller 240 transmits the control signal to the pulse varying unit 222 of the inverter circuit 220 and the pulse varying unit 222 generates a variable value to supply the operation control signal based on the variable value from the outputting unit 224 to the compressor 100.

Therefore, the compressor 100 is operated by the maximum output in accordance with the operation control signal.

When it is determined in S305 that the temperature of the inside of the refrigerator compartment is no more than the maximum output temperature, it is determined whet her the compressor is operated by the refrigerating force constant 3 (S315). When the compressor is operated by the refrigerating force constant 3, the temperature of the inside of the refrigerator compartment is compared with the second target temperature (S320). When the temperature of the inside of the refrigerator compartment is no more than the second target temperature, the refrigerating force constant 3 of the compressor is cancelled (S325).

That is, when the temperature of the inside of the refrigerator compartment 32 is no more than the maximum output temperature, the controller 240 determines whether the compressor 100 is operated by the refrigerating force constant 3.

Here, the refrigerating force constant 3 means that the compressor 100 is operated by the output between 74% and 65% for the maximum output operation. That is, since the refrigerating force constant 3 varies the stroke of the compressor 10 so that an output is smaller than the maximum output operation, power consumption is reduced.

Therefore, the controller 240 performs control so that the operation by the refrigerating force constant 3 is cancelled when the temperature of the inside of the refrigerator compartment 32 is no more than the second target temperature after comparing the temperature of the inside of the refrigerator compartment 32 with the second target temperature when the compressor 100 is operated by the refrigerating force constant 3.

When it is determined in S315 that the compressor is not operated by the refrigerating force constant 3, it is determined that the temperature of the inside of the refrigerator compartment is no less than the third set temperature based on the second target temperature (S330). When the temperature of the inside of the refrigerator compartment is no less than the third set temperature, the compressor is operated by the refrigerating force constant 3 (S235).

That is, when the compressor 100 is not operated by the refrigerating force constant 3, the controller 240 compares the temperature of the inside of the refrigerator compartment 32 with the third set temperature.

At this time, when the temperature of the inside of the refrigerator compartment 32 is no less than the third set temperature, the controller 240 controls the inverter circuit 220 so that the compressor 100 is operated by the refrigerating force constant 3.

When it is determined in S330 that the temperature of the inside of the refrigerator compartment is no more than the third set temperature, it is determined whether the compressor is operated by the refrigerating force constant 4 (S340). When the compressor is operated by the refrigerating force constant 4, it is determined whether the temperature of the inside of the refrigerator compartment is no more than a fourth set temperature (S345). When the temperature of the inside of the refrigerator compartment is no more than the fourth set temperature, the operation by the refrigerating force constant 4 is cancelled (S350).

That is, the controller 240 determines whether the compressor 100 is operated by the refrigerating force constant 4.

The controller 240 determines the refrigerating force constant 4 by the current and the voltage supplied from the inverter circuit 220 to the compressor 100.

Then, the controller 240 performs control so that it is determined whether the temperature of the inside of the refrigerator compartment 32 is no more than the fourth set temperature when the compressor 100 is operated by the refrigerating force constant 4 and that the operation of the compressor 100 by the refrigerating force constant 4 is cancelled when it is determined that the temperature of the inside of the refrigerator compartment 32 is no more than the fourth set temperature.

Here, in the refrigerating force constant 4, the compressor 100 is operated by an output between 64% and 45% for the maximum output.

When it is determined in S340 that the compressor is not operated by the refrigerating force constant 4, the compressor is operated by the refrigerating force constant 4 (S355).

That, when the compressor 100 is not operated by the refrigerating force constant 4, the controller 240 performs control so that the compressor is operated by the refrigerating force constant 4 and that the temperature of the inside of the refrigerator compartment 32 is reduced.

In the refrigerator according to the present invention and the method of controlling the same, the output of the compressor is compared with the temperatures of the insides of the freezer compartment and the refrigerator compartment, the first and second target temperatures, and the first, second, third, and fourth set temperatures and the stroke of the compressor varies so that the output of the compressor varies at one period interval based on the comparison result. Therefore, it is possible to reduce the power consumption of the compressor.

Although embodiments of the present invention have been described with reference to drawings, these are merely illustrative, and those skilled in the art will understand that various modifications and equivalent other embodiments of the present invention are possible. Consequently, the true technical protective scope of the present invention must be determined based on the technical spirit of the appended claims.

INDUSTRIAL APPLICABILITY

In the refrigerator according to the present invention and the method of controlling the same, the output of the compressor can be controlled at one period interval based on the temperatures of the insides of the freezer compartment and the refrigerator compartment and the set temperature so that power consumption for maintaining the refrigerating force of the freezer compartment and the refrigerator compartment can be reduced, that power required for a user to use a product is reduced, and that productivity and efficiency are improved.

The invention claimed is:

1. A method of controlling a refrigerator, comprising:
varying a stroke of an inverter linear compressor to operate the inverter linear compressor at a maximum output when a temperature of an inside of a freezer compartment or a refrigerator compartment is higher than a maximum output temperature; and
varying the stroke of the inverter linear compressor for one period interval to operate the inverter linear compressor when the temperature of the inside of the freezer compartment or the refrigerator compartment is no more than the maximum output temperature, wherein, in varying the stroke of the inverter linear compressor for the one period interval to operate the linear compressor when the temperature of the inside of the freezer compartment or the refrigerator compartment is no more than the maximum output temperature, the stroke of the inverter linear compressor is varied so that an output varies:

when the temperature of the inside of the freezer compartment is between a first target temperature and a first set temperature;
when the temperature of the inside of the freezer compartment is between the first target temperature and a second set temperature;
when the temperature of the inside of the refrigerator compartment is between a second target temperature and a third set temperature; and
when the temperature of the inside of the refrigerator is between the second target temperature and a fourth set temperature,
wherein the first set temperature is higher than the second set temperature, and the third set temperature is higher than the fourth set temperature,
wherein a first period of the stroke of the inverter linear compressor, which varies when the temperature of the inside of the freezer compartment is higher than the first set temperature, precedes a second period of the stroke of the inverter linear compressor, which varies when the temperature of the inside of the freezer compartment is higher than the second set temperature, and
wherein the first period is longer than the second period.

2. The method of claim 1,
wherein a third period of the stroke of the inverter linear compressor, which varies when the temperature of the inside of the refrigerator compartment is higher than the third set temperature, precedes the first period,
wherein the first period is longer than the third period, and
wherein an output power of the inverter linear compressor during the first period is greater than an output power of the inverter linear compressor during the third period.

3. The method of claim 1, wherein a third period of the stroke of the inverter linear compressor, which varies when the temperature of the inside of the refrigerator compartment is higher than the third set temperature, precedes a fourth period of the stroke of the inverter linear compressor, which varies when the temperature of the inside of the refrigerator compartment is higher than the fourth set temperature.

4. The method of claim 1, wherein the varying the stroke of the inverter linear compressor for the one period interval to operate the inverter linear compressor when the temperature of the inside of the freezer compartment or the refrigerator compartment is no more than the maximum output temperature is cancelled when the temperature of the inside of the freezer compartment is no more than the second set temperature or when the temperature of the inside of the refrigerator compartment is no more than the fourth set temperature.

5. The method of claim 1, wherein, when the temperature of the inside of the freezer compartment is between the first target temperature and the first set temperature, the output of the inverter linear compressor is between 85% and 75% of a maximum output.

6. The method of claim 1, wherein, when the temperature of the inside of the refrigerator compartment is between the second target temperature and the third set temperature, the output of the inverter linear compressor is between 74% and 65% of the maximum output.

7. The method of claim 1, wherein, when the temperature of the inside of the freezer compartment is between the first target temperature and the second set temperature, the output of the inverter linear compressor is between 74% and 55% of the maximum output.

8. The method of claim 1, wherein, when the temperature of the inside of the refrigerator compartment is between the second target temperature and the fourth set temperature, the output of the inverter linear compressor is between 65% and 45% of the maximum output.

9. A refrigerator, comprising:
an inverter circuit that supplies an operating control signal so that an inverter linear compressor is operated;
at least one sensor that measures temperatures of insides of a freezer compartment and a refrigerator compartment; and
a controller that compares the temperature of the inside of the freezer compartment or the refrigerator compartment with a maximum output temperature to supply a control signal to the inverter circuit so that the stroke of the inverter linear compressor varies for one period interval and the output of the inverter linear compressor varies when the temperature of the inside of the freezer compartment or the refrigerator compartment is no more than the maximum output temperature, wherein, in varying the stroke of the inverter linear compressor for the one period interval to operate the linear compressor when the temperature of the inside of the freezer compartment or the refrigerator compartment is no more than the maximum output temperature, the stroke of the inverter linear compressor is varied so that an output varies:
when the temperature of the inside of the freezer compartment is between a first target temperature and a first set temperature;
when the temperature of the inside of the freezer compartment is between the first target temperature and a second set temperature;
when the temperature of the inside of the refrigerator compartment is between a second target temperature and a third set temperature; and
when the temperature of the inside of the refrigerator is between the second target temperature and a fourth set temperature,
wherein the first set temperature is higher than the second set temperature, and the third set temperature is higher than the fourth set temperature,
wherein a first period of the stroke of the inverter linear compressor, which varies when the temperature of the inside of the freezer compartment is higher than the first set temperature, precedes a second period of the stroke of the inverter linear compressor, which varies when the temperature of the inside of the freezer compartment is higher than the second set temperature, and
wherein the first period is longer than the second period.

10. The refrigerator of claim 9, wherein the inverter circuit comprises:
a pulse varying device that varies the operation control signal in accordance with the control signal;
an inverter that supplies a power source to the inverter linear compressor in accordance with the operation control signal; and
a measuring device that measures a power source supplied to the inverter linear compressor.

11. The refrigerator of claim 9, wherein the at least one sensor is a temperature sensor that measures temperatures in the outsides or insides of the freezer compartment and the refrigerator compartment.

12. The refrigerator of claim 9, wherein the controller outputs the control signal to vary the stroke of the inverter linear compressor so that the inverter linear compressor is operated by the at a maximum output when the temperature of the inside of the freezer compartment or the refrigerator compartment is no less than the maximum output temperature.

13. The refrigerator of claim 12, wherein, when the temperature of the inside of the freezer compartment is no more than the maximum output temperature and between the first target temperature and the first set temperature, the controller supplies the operation control signal so that the stroke of the inverter linear compressor varies and an output is between 85% and 75% of the maximum output.

14. The refrigerator of claim 12, wherein, when the temperature of the inside of the freezer compartment is between the first target temperature and the second set temperature, the controller supplies the operation control signal so that the stroke of the inverter linear compressor varies and an output is between 74% and 55% of the maximum output.

15. The refrigerator of claim 11, wherein, when the temperature of the inside of the refrigerator compartment is no more than the maximum output temperature and between the second target temperature and the third set temperature, the controller supplies the operation control signal so that the stroke of the inverter linear compressor varies and that an output is between 74% and 65% of the maximum output.

16. The refrigerator of claim 15, wherein, when the temperature of the inside of the refrigerator compartment is no more than the maximum output temperature and between the second target temperature and the fourth set temperature, the controller supplies the operation control signal so that the stroke of the inverter linear compressor varies and an output is between 65% and 45% of the maximum output.

17. The refrigerator of claim 9, wherein a third period of the stroke of the inverter linear compressor, which varies when the temperature of the inside of the refrigerator compartment is higher than the third set temperature, precedes the first period, wherein the first period is longer than the third period, and wherein an output power of the inverter linear compressor during the first period is greater than an output power of the inverter linear compressor during the third period.

18. The refrigerator of claim 9, wherein a third period of the stroke of the inverter linear compressor, which varies when the temperature of the inside of the refrigerator compartment is higher than the third set temperature, precedes a fourth period of the stroke of the inverter linear compressor, which varies when the temperature of the inside of the refrigerator compartment is higher than the fourth set temperature.

* * * * *